United States Patent [19]

Bowen et al.

[11] Patent Number: 5,003,036

[45] Date of Patent: Mar. 26, 1991

[54] YARN WITH IMPROVED HYDROLYTIC STABILITY FROM AROMATIC POLYAMIDE COMPRISING CHLOROTEREPHTHALAMIDE UNITS

[75] Inventors: Michael W. Bowen, Midlothian; Charles King; Hung H. Yang, both of Richmond, all of Va.

[73] Assignee: E. I. DuPont de Nemours

[21] Appl. No.: 349,866

[22] Filed: May 10, 1989

[51] Int. Cl.$^5$ .............................................. C08G 69/32
[52] U.S. Cl. .................................... 528/348; 525/432; 528/339
[58] Field of Search ................. 528/348, 339; 525/432

[56] References Cited

U.S. PATENT DOCUMENTS

| | | | |
|---|---|---|---|
| 3,063,966 | 11/1962 | Kwolek et al. | 260/78 |
| 3,560,137 | 2/1971 | Hahn | 8/115.5 |
| 3,671,542 | 6/1972 | Kwolek | 260/30.8 |
| 3,767,756 | 10/1973 | Blades | 264/184 |
| 3,869,429 | 3/1975 | Blades | 260/78 |
| 3,869,430 | 4/1975 | Blades | 260/78 |

OTHER PUBLICATIONS

The Condensed Chemical Dictionary, Eighth Edition, 1971, p. 448.

Primary Examiner—Harold D. Anderson

[57] ABSTRACT

Aromatic polyamide fibers of high hydrolytic stability are disclosed. The polyamide is a copolymer including chloroterephthalamide or a blend of homopolymers including one with chloroterephthalamide; and the fibers are dried under tension or heat treated.

13 Claims, No Drawings

YARN WITH IMPROVED HYDROLYTIC STABILITY FROM AROMATIC POLYAMIDE COMPRISING CHLOROTEREPHTHALAMIDE UNITS

BACKGROUND OF THE INVENTION

1. Field of the Invention

This invention relates to para-aramid fibers with excellent physical properties and a high degree of hydrolytic stability; and to a process for making such fibers.

2. Description of the Prior Art

U.S. Pat. No. 3,560,137, issued Feb. 2, 1971 on the application of Hahn, discloses aromatic polyamides having increased hydrolytic durability. Hahn recognized the need for increased hydrolytic stability in fibers which had been damaged by crimping and disclosed that poly(metaphenylene isophthalamide) fibers should be subjected to a heat treatment after the crimping, under no tension.

U.S. Pat. Nos. 3,869,429 and 3,767,756, issued Mar. 4, 1975 and Oct. 23, 1973, respectively, on the applications of Blades, disclose high strength para-aramid fibers. The Blades patents disclose a variety of copolymer compositions for the para-aramid fibers; and specifically disclose a homopolymer using chloroterephthaloyl chloride and copolymers using chloroterephthaloyl chloride and terephthaloyl chloride in mole ratios of 5/95 and 50/50. There is disclosure of drying at 150°–160° C. and it is recommended that low tension be used. As to heat treating, general disclosed conditions are 150°–550° C. for durations of 1–6 seconds at tensions of 0.5–12 gpd.

U.S. Pat. No. 3,869,430, issued Mar. 4, 1975 on the application of Blades, discloses heat treatment for para-aramid fibers wherein the fibers are subjected to temperatures of, preferably, 250°–600° C. for 0.5–5 seconds and 1–8 gpd. This patent contains no reference to chloro-containing para-aramid copolymers.

U.S. Pat. No. 3,671,542, issued June 20, 1972 on the application of Kwolek, discloses fibers made from homopolymer of poly(p-phenylene 2,5-dichloroterephthalamide) and heat treating those fibers.

SUMMARY OF THE INVENTION

The present invention provides yarns of greatly improved hydrolytic stability made from fibers of aromatic polyamides with at least 10 mole percent chloroterephthalamide in the polymer composition. The polymer composition includes copoly(p-phenylene terephthalamide/chloroterephthalamide) (hereinafter "PPD-T/ClT") used alone; and also includes blends of such copolymer with poly(p-phenylene terephthalamide) homopolymer. The yarns of PPD-T/ClT copolymer and blends of copolymer with homopolymer, when heat treated or dried under tension according to the invention, exhibit tensile properties comparable with fibers made from PPD-T homopolymer—tenacity of greater than 18 grams per denier; but having dramatically improved hydrolytic stability.

DETAILED DESCRIPTION OF THE INVENTION

Fibers of aromatic polyamides are well known for their high strength and high modulus. There has long been a need, however, for fibers of such high strength and high modulus which, also, have high stability on exposure to aqueous, particularly alkaline, environments. Fibers exhibiting a high hydrolytic stability will find particular use in such fields as reinforced piping and underwater roping, as well as, other applications involving water contact.

The fibers of this invention can be made exclusively from copolymers having chloroterephthalamide or they can be made from blends of such copolymers or homopolymers with chloroterephthalamide and PPD-T homopolymer. It is an important element of the description of this invention to note that the hydrolytic stability of these fibers exhibits a remarkable and surprising jump at greater than 10 mole percent chloroterephthalamide content and most notably at 20 mole percent and greater. Making the Copolymer.

PPD-T/ClT copolymers used in the fibers of the present invention are made up of p-phenylene diamine as the diamine and terephthaloyl chloride and chloroterephthaloyl chloride, in the form of monochloroterephthaloyl chloride and dichloroterephthaloyl chloride, as the acid chloride. The chloroterephthaloyl chloride is, generally, greater than 70 mole percent monochloroterephthaloyl chloride and less than 30 mole percent dichloroterephthaloyl chloride; and such is preferred for practice of this invention. Substantially pure monochloroterephthaloyl chloride and dichloroterephthaloyl chloride, although rather difficult to obtain, can, also, be used in practice of this invention. It is to be understood that up to as much as 5 mole percent of the diamine can be other than p-phenylene diamine and that up to as much as 5 mole percent of the acid chloride can be other than the terephthaloyl chloride and chloroterephthaloyl chloride. The limit of 5 mole percent is rather arbitrary because substitute monomers which are very similar to the initial monomers can be used in greater amounts and, in some cases where the substitute monomers are greatly different from the initial monomers, less than 5 mole percent can be used. The amount of substitute monomers which can be tolerated in the practice of this invention, depends upon whether or not the substitute monomers so alter the character of the copolymer that fibers made from that copolymer are not within the invention.

The polymer composition used in practice of this invention can include usually-used additives such as dyes, fillers, delusterants, stabilizers, anti-oxidants and the like.

The copolymer and the PPD-T homopolymer, when used, can be conveniently made by any of the well known polymerization processes such as those taught in U.S. Pat. Nos. 3,063,966 and 3,869,429. One process for making the copolymer of this invention includes dissolving one mole of p-phenylene diamine in a solvent system comprising about one mole of calcium chloride and about 2.5 liters of N-methyl-2-pyrrolidone and then adding a blend of one mole, total, of the terephthaloyl chloride and chloroterephthaloyl chloride with agitation and cooling. The addition of the diacid chlorides is usually accomplished in two steps—the first addition step being about 25–35 weight percent of the total with the second addition step occurring after the system has been mixed for about 15 minutes. Cooling is applied to the system after the second addition step to maintain the temperature below about 75° C. Under forces of continued agitation, the copolymer gels and then crumbles; and, after at least thirty minutes, the resulting crumb-like copolymer is allowed to stand without agitation for several hours and is then washed several times in water and dried in an oven at about 100°–150° C. Other copolymers of this invention can be made in accordance with the process outlined above when the mole fraction of chloroterephthaloyl chloride is from 0.05 to 1.0 based on total acid chlorides. When the copolymer includes more than about 85 mole percent chloroterephthalate, the copolymer does not gel and no crumb is formed—the reaction system simply becomes very viscous as the polymerization proceeds to conclusion.

Molecular weight of the polymer is dependent upon a multitude of conditions. For example, to obtain polymer of high molecular weight, reactants and solvent should be free from impurities and the water content of the total reaction system should be as low as possible—at least less than 0.03 weight percent. Care should be exercised to use substantially equal moles of the diamine and the diacid chlorides in order to assure highest molecular weight.

The polymers of this invention can also be made by continuous polymerization and other solvents can be used such as tetramethyl urea, dimethyl acetamide, hexamethyl phosphoramide, and the like, alone or in combination with N-methyl-2-pyrrolidone. While it may be preferred that inorganic salts be added to the solvent to assist in maintaining a solution of the copolymers as it is formed, quaternary ammonium salts have, also, been found to be effective in maintaining the copolymer solution. Examples of useful quaternary ammonium salts include: methyl tri-n-butyl ammonium chloride; methyl tri-n-propyl ammonium chloride; tetra-n-butyl ammonium chloride; and tetra-n-propyl ammonium chloride.

Yarns of this invention are made by extruding a dope of the copolymer or polymer blend by the dry-jet wet spinning processes, such as are taught, for example, in U.S. Pat. No. 3,767,756.

A dope can be prepared by dissolving an adequate amount of the polymer in an appropriate solvent. Sulfuric acid, chlorosulfuric acid, fluorosulfuric acid and mixtures of these acids can be identified as appropriate solvents. Sulfuric acid is much the preferred solvent and should, generally, be used at a concentration of 98% by weight or greater. It has been determined, however, that increasing mole fractions of chloroterephthalamide will permit use of less concentrated sulfuric acid. The polymer should be dissolved in the acid in the amount of at least 40, preferably more than 43 grams of polymer per 100 milliliters of solvent. The densities, at 25° C., of the acid solvents are as follows: 98% $H_2SO_4$, 1.83 g/ml; $HSO_3Cl$, 1.79 g/ml; and $HSO_3F$, 1.74 g/ml.

Before preparation of the spinning dope, the copolymer and homopolymer, if used, and other ingredients should be carefully dried, preferably to less than one weight percent water; the polymer and the solvent should be combined under dry conditions; and the dope should be stored under dry conditions. Care should be exercised to exclude atmospheric moisture. Dopes should be mixed and held in the spinning process at as low a temperature as is practical to keep them liquid in order to reduce degradation of the polymer. Exposure of the dopes to temperatures of greater than 90° C. should be minimized.

The dope, once prepared, can be used immediately or stored for future use. If stored, the dope is preferably frozen and stored in solid form in an inert atmosphere such as under a dry nitrogen blanket. If the dope is to be used immediately, it can conveniently be made continuously and fed directly to spinnerets. Continuous preparation and immediate use minimizes degradation of the polymer in the spinning process.

The dopes are, typically, solid at room temperature. The bulk viscosity of dopes made with a particular polymer increases with molecular weight of the polymer for given temperatures and concentrations and the bulk viscosity of dopes decreases with increasing mole fractions of chloroterephthalamide.

Dopes can generally be extruded at any temperature where they are sufficiently fluid. Since the degree of degradation is dependent upon time and temperature, it is important that temperatures be as low as possible. Temperatures below about 90° C. are preferable and temperatures of about 75° to 85° C. are usually used. If higher temperatures are required or desired for any reason, processing equipment should be designed so that the dope is exposed to the higher temperatures for a minimum time.

Dopes used to make the yarns of this invention are optically anisotropic, that is microscopic regions of a dope are birefringent and a bulk sample of the dope depolarizes plane-polarized light because the light transmission properties of the microscopic regions of the dope vary with direction. It is believed to be important that the dopes used in this invention must be anisotropic, at least in part.

Dopes are extruded through spinnerets with orifices ranging from about 0.025 to 0.25 mm in diameter, or perhaps slightly larger or smaller. The number, size, shape, and configuration of the orifices are not critical. The extruded dope is conducted into a coagulation bath through a noncoagulating fluid layer. While in the fluid layer, the extruded dope is stretched from as little as 1 to as much as 15 time its initial length (spin stretch factor). The fluid layer is generally air but can be any other inert gas or even liquid which is a noncoagulant for the dope. The noncoagulating fluid is generally from 0.1 to 10 centimeters in thickness.

The coagulation bath is aqueous and ranges from pure water, or brine, to as much as 70% sulfuric acid. Bath temperatures can range from below freezing to about 28° C. or, perhaps, slightly higher. It is preferred that the temperature of the coagulation bath be kept below about 10° C., and more preferably, below 5° C., to obtain fibers with the highest initial strength.

As the extruded dope is conducted through the coagulation bath, the dope is coagulated into a water-swollen fiber and is ready for drying and, if desired, heat treatment. The fiber includes about 20 to 100% percent aqueous coagulation medium, based on dry fiber material, and, for the purposes of this invention, must be thoroughly washed to remove the salt and acid from the interior of the swollen fiber. Fiber-washing solutions can be pure water or they can be slightly alkaline. The washing can be controlled by immersing spools of the fiber in a washing bath or by passing the fiber through a bath or spray of washing liquid. Care should be exercised to remove as much as possible of the salt and acid residue from the spinning process.

The heat treatment and high tension drying of this invention are conducted on never-dried fibers; and, for purposes of this invention, "never-dried" means that the fibers have been newly-spun and never dried to less than 20 percent moisture prior to operation of the heat treating or drying under tension. Never-dried fibers may have from 20 to 100 percent moisture, based on the weight of the polymer. It is believed that previously-dried fibers cannot successfully be heat treated or dried under tension for this invention because the heat treatment and drying under tension is effective only when performed on the polymer molecules at the time that the structure is being dried and ordered into a compact fiber and before the structure has been collapsed by removal of the water.

High tension drying is conducted by subjecting never-dried fibers to a tension of 1–12 grams per denier at a temperature of 100° to 250° C., preferably 160°–80° C., for a time of 15–25 seconds. The preferred tension is 2–6 grams per denier and the temperature and time should be selected within the above-noted ranges to achieve a final moisture on the yarn of about 8–14%. The high tension drying is conveniently conducted by wrapping the never-dried yarn several times over a steam heated roll with the number of wraps selected to achieve the desired drying time.

Heat treating is conducted by exposing never-dried fibers in an oven to temperatures of 250°–500° C. for 1.5–12 seconds under a tension of 1–12 grams per denier. The preferred conditions are 350°–400° C. for 2–8 seconds at 2–6 grams per denier.

TEST PROCEDURES

Inherent Viscosity. Inherent Viscosity (IV) is defined by the equation:

$$IV = \ln(\eta_{rel})/c$$

where c is the concentration (0.5 gram of polymer in 100 ml of solvent) of the polymer solution and $\eta_{rel}$ (relative viscosity) is the ratio between the flow times of the polymer solution and the solvent as measured at 30° C. in a capillary viscometer. The inherent viscosity values reported and specified herein are determined using concentrated sulfuric acid (96% $H_2SO_4$).

Tensile Properties. Yarns tested for tensile properties are, first, conditioned and, then, twisted to a twist multiplier of 1.1. The twist multiplier (TM) of a yarn is defined as:

$$TM = (twists/inch)/(5315/denier\ of\ yarn)^{-\frac{1}{2}}$$

The yarns to be tested are conditioned at 25° C., 55% relative humidity for a minimum of 14 hours and the tensile tests are conducted at those conditions. Tenacity (breaking tenacity), elongation (breaking elongation), and modulus are determined by breaking test yarns on an Instron tester (Instron Engineering Corp., Canton, Mass.).

Tenacity, elongation, and initial modulus, as defined in ASTM D2101-1985, are determined using yarn gage lengths of 25.4 cm and an elongation rate of 50% strain/minute. The modulus is calculated from the slope of the stress-strain curve at 1% strain and is equal to the stress in grams at 1% strain (absolute) times 100, divided by the test yarn denier.

Denier. The denier of a yarn is determined by weighing a known length of the yarn. Denier is defined as the weight, in grams, of 9000 meters of the yarn.

In actual practice, the measured denier of a yarn sample, test conditions and sample identification are fed into a computer before the start of a test; the computer records the load-elongation curve of the yarn as it is broken and then calculates the properties.

Hydrolytic Stability. Hydrolytic Stability is reported as percent of break strength (tenacity) retained after a certain exposure to an aqueous alkaline environment. To perform the test, a portion of a length of finished yarn is immersed in an aqueous 10% solution of sodium hydroxide at 95° C. for 20 hours; and the yarn is, then, thoroughly washed and dried at ambient temperatures under no tension. Tenacity determinations are conducted on the treated yarn ($T^1$) and, as a control, on the untreated yarn ($T^2$). The hydrolytic stability is:

$$Hyd.\ Stab. = \frac{(T_1)}{(T_2)} \times 100$$

DESCRIPTION OF THE PREFERRED EMBODIMENTS

In the examples provided, below, all amounts are in mole percent or mole ratio, unless specified otherwise.

EXAMPLE A

Preparation of 2-chloroterephthaloyl chloride (ClTCl) and 2,5-dichloroterephthaloyl chloride (DClTCl)

This example illustrates the preparation of 2-chloroterephthaloyl chloride (ClTCl) and 2,5-dichloroterephthaloyl chloride (DClTCl) by the chlorination of terephthaloyl chloride and subsequent separation using 4-stage distillation.

High-purity terephthaloyl chloride (TCl) was chlorinated with chlorine gas in a reaction vessel in the presence of ferric chloride at 150° C. for 24 hours. The resulting chlorination products were approximately 50% TCl, 37% ClTCl and 13% DClTCl. The chlorination products were distilled in a 60-tray distillation column and separated into two fractions: approximately 60 wt. % heavy fraction containing 25/56/18 TCl/ClTCl/DClTCl, and approximately 40 wt. % light fraction containing 78/9/13 TCl/ClTCl/DClTCl. The ClTCl-rich fraction was distilled and separated into a heavy fraction containing mostly ClTCl and DClTCl and trace amount of TCl, and a light fraction containing mostly TCl and about 1% ClTCl. The heavy fraction from the second-stage distillation was flash distilled to remove small amounts of tar materials. The flash distillate was redistilled and separated into a heavy fraction containing 99.7/0.3 ClTCl/DClTCl and a light fraction containing 3/97/<0.3 TCl/ClTCl/DClTCl.

EXAMPLE B

Preparation of 95/5 PPD-T/ClT Copolymer

This example illustrates the preparation of a 95/5 copoly(p-phenylene terephthalamide/2-chloroterephthalamide (PPD-T/ClT) by low temperature polycondensation in a large stirred reactor.

In a stirred reactor under nitrogen atmosphere, 11.4 gallons anhydrous N-methylpyrrolidone (NMP), 2761 g (25.53 moles) p-phenylenediamine (PPD), and 3854 g (34.72 moles) anhydrous calcium chloride were stirred with the main stirrer at room temperature for 3 hours until all salt and diamine were dissolved. The mixture was cooled to 5° C., and 1816 g (8.95 moles) terephthaloyl chloride (TCl) were rapidly added. The mixture was stirred for ten minutes at ambient temperature and recooled to 5° C. A diacid chloride mixture containing 3140 g (15.47 moles) terephthaloyl chloride and 287 g (1.21 moles) 2-chloroterephthaloyl chloride (ClTCl), was rapidly added. The resulting mixture was stirred under nitrogen at ambient temperature. A secondary stirrer/chopper was activated 3 to 8 minutes after the second-stage addition of acid chloride to reduce the polymer particle size. The mixture temperature was controlled at less than 70° C., preferably 65° C. The polymerization mixture was stirred with the main stirrer and the chopper for 200–300 additional minutes, and left standing overnight at room temperature under nitrogen in the reaction vessel without stirring. The polymer mixture was then discharged from the reactor. (In some cases as will be shown in the following examples, it was necessary to break up the polymer mixture after standing by further stirring with the reactor stirrer and the chopper under nitrogen at ambient temperature before discharging it.) The polymer mixture was washed and filtered with 35 gallons of deionized water 25 times to isolate the polymer. The isolated polymer was neutralized to pH>6, and dried at 120° C. under vacuum. The inherent viscosity of the dry polymer was 7.7 dl/g.

EXAMPLE C

Preparation of 90/10 PPD-T/ClT Copolymer

This example illustrates the preparation of a 90/10 copoly(p-phenylene terephthalamide/2-chloroterephthalamide). The procedure of Example B was repeated except that the acid chloride for the second-stage addition contained 2896 g (14.26 moles) terephthaloyl chloride and 567 g (2.39 moles) 2-chloroterephthaloyl chloride, and that the polymer mixture was stirred with the stirrer and the chopper for 180 minutes, left standing overnight under nitrogen, and mixed 120 additional minutes before it was discharged from the reactor. The polymer thus obtained had an inherent viscosity of 7.63 dl/g.

EXAMPLE D

Preparation of 80/20 PPD-T/ClT Copolymer

This example illustrates the preparation of an 80/20 copoly(p-phenylene terephthalamide/2-chloroterephthalamide). The procedure of Example B was repeated except that the acid chloride for the second-stage addition contained 2415 g (11.90 moles) terephthaloyl chloride and 1135 g (4.80 moles) 2-chloroterephthaloyl chloride, and that the polymer was mixed with the stirrer and chopper for 195 minutes. The maximum reaction temperature was 61° C. The polymer mixture was left standing overnight under nitrogen, and mixed for 60 additional minutes before it was discharged from the reactor. The polymer thus obtained had an inherent viscosity of 5.88 dl/g.

EXAMPLE E

Preparation of 70/30 PPD-T/ClT Copolymer

This example illustrates the preparation of a 70/30 copoly(p-phenylene terephthalamide/2-chloroterephthalamide). The procedure of Example B was repeated except that the acid chloride for the second-stage addition contained 1859 g (9.16 moles) terephthaloyl chloride and 1779 g (7.49 moles) 2-chloroterephthaloyl chloride, and that the polymer mixture was mixed with the stirrer and chopper for 230 minutes, left standing overnight under nitrogen, and mixed for 90 additional minutes before it was discharged from the reactor. The polymer thus obtained had an inherent viscosity of 5.9 dl/g.

EXAMPLE F

Preparation of 60/40 PPD-T/ClT Copolymer

This example illustrates the preparation of a 60/40 copoly(p-phenylene terephthalamide/2-chlorotereph-thalamide). The procedure of Example B was repeated except that the acid chloride for the second-stage addition contained 1354 g (6.67 moles) terephthaloyl chloride and 2372 g (9.99 moles) 2-chloroterephthaloyl chloride, and that the polymer mixture was mixed with the stirrer and chopper 114 minutes and was discharged from the reactor without overnight standing or additional mixing. The polymer thus obtained had an inherent viscosity of 5.4 dl/g.

EXAMPLES G, H, I

Preparation of 50/50, 40/60, and 30/70 PPD-T/ClT Copolymers

For preparation of these copolymers, the procedure of Example B was repeated except that the acid chloride was added in three stages;—the additions each including 30, 35, and 35 weight percent of the total acid chlorides. In the table below, are designated the total amounts of TCl and ClTCl, as well as the weight percent of the TCl in the additions of each stage and the inherent viscosity of each copolymer.

|   | TCl (g) | TCl (%/stage) | | | ClTCl (g) | IV (dl/g) |
|---|---|---|---|---|---|---|
|   |   | 1st | 2nd | 3rd |   |   |
| G | 2569 | 60 | 20 | 20 | 2772 | 4.7 |
| H | 2021 | 76 | 12 | 12 | 3404 | 5.2 |
| I | 1409 | 87 | 6.5 | 6.5 | 3833 | 3.9 |

EXAMPLE J

Preparation of Poly(p-phenylene chloroterephthalamide) (PPD-ClT)

This example illustrates the preparation of poly(p-phenylene chloroterephthalamide). The procedure of Example B was repeated except that 1260 g (11.65 moles) PPD and 2014 g (18.14 moles) anhydrous calcium chloride were stirred with the main stirrer at room temperature for three hours until all salt/diamine were dissolved and that the acid chloride for the first stage addition was 950 g (4.01 moles) ClTCl and the second stage was 1812 g (7.65 moles) ClTCl. The solution became viscous within 5 minutes, but the polymer did not gel or precipitate. The polymerization mixture was stirred with the main stirrer only for 150 minutes under nitrogen and ambient temperatures. Water was added in small portions to the reaction mixture in a blender to precipitate the polymer. The precipitated fibrous polymer was then washed and filtered with 35 gallons of deionized water 25 times to isolate the polymer. The isolated polymer was neutralized to pH>6 and dried at 120° C. under vacuum. The inherent viscosity of the polymer thus obtained was 4.2 dl/g.

EXAMPLE K

Preparation of 95/5 PPD-T/DClT Copolymer

This example illustrates the preparation of a 95/5 copoly(p-phenylene terephthalamide/dichloroterephthalamide) (PPD-T/DClT) by low temperature polycondensation in a large stirred reactor.

To prepare the dichloro copolymer of this Example, the procedure of Example B was followed exactly using the same kinds and amounts of materials except that 3116 g (15.34 moles) TCl and 357 g (1.308 moles) dichloroterephthaloyl chloride (DClTCl) were added in the second addition step. The inherent viscosity of the dried polymer was 6.2 dl/g.

EXAMPLE L

Preparation of 90/10 PPD-T/DClT Copolymer

This example illustrates the preparation of a 90/10 copoly(p-phenylene terephthalamide/dichloroterephthalamide) (PPD-T/DClT) by low temperature polycondensation in a large stirred reactor. The procedure of Example K was repeated except that the acid chloride for the second stage addition contained 2851 g (14.04 moles) TCl and 714 g (2.63 moles) DClTCl. The acid chloride mixture was stirred 200 minutes, stored overnight under nitrogen, and discharged into the reactor. The inherent viscosity of polymer thus obtained was 5.6 dl/g.

EXAMPLE M

Preparation of 82/18 PPD-T/DClT Copolymer

This example illustrates the preparation of a 82/18 PPD-T/DClT copoly(p-phenyleneterephthalamide/dichloroterephthalamide) by low temperature polycondensation in a large stirred reactor. The procedure of Example K was repeated except that the acid chloride for the second stage addition contained 2428 g (11.96 moles) TCl and 1282 g (4.72 moles) DClTCl. The acid chloride mixture was stirred 235 minutes, stored overnight under nitrogen, and discharged into the reactor. The inherent viscosity of the polymer was 4.8 dl/g.

EXAMPLE N

Preparation of 79.5/16/4.5 PPD-T/ClT/DClT Copolymer

This example illustrates the feasibility of preparing a PPD-T/ClT/DClT copolymer from a mixture of acid chlorides which is obtainable from the first-stage distillation of the chlorination products. The procedure of Example B was repeated except that a synthetic mixture of acid chlorides was prepared by mixing TCl, ClTCl and DClTCl in the mole ratio of 79.5/16/4.5. The polymer thus obtained had an inherent viscosity of 4.2 dl/g.

EXAMPLES 1-2 (Controls)

Fibers of Poly(p-phenylene terephthalamide) (PPD-T)

This control example illustrates that the hydrolytic stability of poly(p-phenylene terephthalamide) (PPD-T) fiber prepared according to spinning processes described in U.S. Pat. Nos. 3,767,756 (Blades) and 4,340,559 (Yang) was improved by heat treatment. A spin solution was prepared from PPD-T polymer of 6.3 dl/g inherent viscosity at a concentration of 19.4% by weight PPD-T in 100.1% sulfuric acid and the solution was extruded through a spinneret at about 80° C. The extruded filaments passed through an air gap of 0.25 in (0.64 cm) and then through a coagulating liquid maintained at 2° C. and consisting of water and 1-5% by weight $H_2SO_4$. After washing, neutralizing, and drying on steam-heated rolls at an inlet tension of about 0.5-0.7 gpd, the dry yarn was wound up at a speed of 250 ypm. The as-spun yarn had a nominal 400 denier at 1.5 dpf. It had tensile properties of 23.5 gpd tenacity, 3.4% elongation at break, and 706 gpd initial modulus. A sample of this yarn was tested for hydrolytic stability by immersing it in a 10% by weight NaOH solution at 95° C. for 20 hours. The thus-hydrolyzed yarn was thoroughly washed with water at room temperature and left to dry at zero tension. The hydrolyzed yarn gave 5.0 gpd retained tenacity, or 21.3% retention of its tenacity before hydrolysis.

Under the same conditions as above, except that the fibers were not dried, a never-dried yarn was passed through a tubular oven at 350°-400° C. in 6 sec. The yarn tension at the inlet of the tubular oven was maintained at about 1200 g (about 3 gpd). The resulting yarn gave tensile properties of 21.5 gpd tenacity, 2.5% elongation at break, and 910 gpd initial modulus. A hydrolytic stability test on the yarn yielded a retained tenacity of 9.1 gpd, or 42.5% tenacity retention. The yarn properties are summarized in Table 1 as Example 1.

Under the same spinning and heat treating conditions except that the yarn linear density was reduced, a 214 denier/0.75 dpf heat treated yarn was prepared. This yarn gave tensile properties of 24.5 gpd tenacity, 2.3% elongation at break, and 1091 gpd initial modulus. When hydrolyzed in 10% NaOH solution at 95° C. for 20 hours, it gave a retained tenacity of 15.1 gpd or 61.6% tenacity retention. The yarn properties are summarized in Table 2 as Example 2 for comparison with other fibers of similar yarn denier and denier per filament.

EXAMPLES 3-17

Fibers of PPD-T/ClT

These examples illustrate further improved hydrolytic stability of heat treated PPD-T/ClT fibers containing 2.5-70 mole % ClT. As shown in Tables 1 and 2, the process of Examples 1 and 2 was repeated except that the starting polymers were varied. It can be seen that the heat treated PPD-T/ClT fibers of this invention gave higher retained tenacity and tenacity retention than the PPD-T homopolymer fiber; and that such fibers with at least 10 mole percent ClT gave much higher retained tenacity and tenacity retention.

EXAMPLES 18-24

Fibers of PPD-T/ClT/DClT

These examples illustrate similar improvement in the hydrolytic stability of heat treated PPD-T/ClT/DClT fibers over PPD-T homopolymer fiber. The process of Examples 1 and 2, including the heat treatment, was repeated except that copolyamides containing various amounts of ClT and DClT were used, as indicated in Table 3. The heat treated copolyamide yarns gave greater values of retained tenacity and % tenacity retention after alkaline hydrolysis in 10% NaOH solution at 95° C. for 20 hours than PPD-T homopolymer fibers prepared under similar spinning and heat treatment conditions.

EXAMPLES 25-32

Fibers of PPD-T and PPD-T/ClT Prepared by High Tension Drying

These examples compare the hydrolytic stability of fibers which were prepared by high tension drying during fiber preparation according to the process described in U.S. Pat. No. 4,726,922 (Cochran et al). The processes of Examples 1 and 2 were repeated except that the as-spun yarn drying was conducted at a tension of 2.5 gpd rather than 0.5-0.7 gpd. Upon alkaline hydrolysis in 10% NaOH solution at 95° C. for 20 hours, all of the PPD-T/ClT fibers of at least 10 mole percent ClT gave greater values of retained tenacity and % tenacity retention than the PPD-T homopolymer fibers under the same high tension drying conditions. Results are shown in Table 4.

EXAMPLES 33-34

Fibers Prepared from PPD-T/ClT vs. Blend of PPD-T and PPD-ClT

These examples compare the tensile properties and hydrolytic stability of fibers prepared from an 80/20 PPD-T/ClT vs. an 80/20 blend of PPD-T and PPD-ClT.

In Example 33, the procedure of Example 1 was repeated except that an 80/20 PPD-T/ClT copolymer was used as the starting material. An anisotropic solution of the copolymer in 100.1% $H_2SO_4$ at 19.4% polymer concentration was prepared and extruded at 80° C. to form a continuous filament yarn through a 0.25 inch air gap and into a coagulation bath of water. The spun filaments were washed with water and neutralized with dilute sodium hydroxide solution over rotating rolls. The as-spun yarn was wound up on a plastic bobbin at 200 ypm. The yarn contained 40 filaments at 1.5 dpf. It was kept in a polyethylene bag to prevent it from drying. It was later heat treated over a hot shoe at 0° C. under 2.5 gpd tension for 6 sec. The tensile properties and hydrolytic stability of these heat treated yarns are summarized in Table 5.

In Example 34, a polymer blend containing 80 wt. % PPD-T and 20 wt. % PPD-ClT was used as the starting material. A continuous filament yarn was prepared by the same process as was used in Example 33. The as-spun yarn was also kept in a polyethylene bag. It was later heat treated under the same conditions as those used in Example 33. The tensile properties and hydrolytic stability of these heat treated and alkaline hydrolyzed yarns are summarized in Table 5.

EXAMPLE 35

Fibers of Poly(p-phenylene 2-chloroterephthalamide) (PPD-ClT)

This example presents the tensile properties and hydrolytic stability of heat treated fibers prepared from PPD-ClT homopolymer.

An anisotropic solution was prepared from a PPD-ClT homopolymer as described in Example J at 19.4% polymer concentration in 100.1% $H_2SO_4$. The solution was extruded at 80° C. to form a continuous filament yarn in a process similar to that used in Example 1. Alkaline hydrolysis of the as-spun yarn resulted in retained tenacity of 9.0 gpd, and tenacity retention of 52.0%. After heat treatment at 300° C. under a tension of 3 gpd for 6 seconds in a steam/nitrogen atmosphere, the tenacity was 18.8 gpd; and a hydrolytic stability test resulted in a retained tenacity of 16.2 gpd, and a tenacity retention of 86.1%.

TABLE 1

| | Heat Treated Nominal 400 d/1.5 dpf Yarns | | | | | | | | | |
|---|---|---|---|---|---|---|---|---|---|---|
| Example | 1 | 3 | 4 | 5 | 6 | 7 | 8 | 9 | 10 | 35 |
| Polymer | PPD-T | | | | | PPD-T/ClT | | | | |
| Mole % ClT | 0 | 5 | 10 | 20 | 30 | 40 | 50 | 60 | 70 | 100 |
| Inh. vis. dl/g | 6.3 | 7.7 | 7.6 | 5.9 | 5.9 | 5.4 | 4.7 | 5.2 | 3.9 | 4.2 |
| | AS SPUN YARN | | | | | | | | | |
| Denier | 403 | 379 | 354 | 400 | 356 | 344 | 328 | | | 420 |
| Dpf | 1.5 | 1.42 | 1.33 | 1.5 | 1.33 | 1.29 | 1.23 | | | 1.5 |
| Tenacity, gpd | 23.5 | 25.7 | 25.9 | 25.0 | 18.4 | 16.1 | 20.6 | | | 17.2 |
| Elongation, % | 3.4 | 3.1 | 3.1 | 3.5 | 2.8 | 2.6 | 3.5 | | | 4.5 |
| Modulus, gpd | 706 | 800 | 855 | 720 | 684 | 686 | 650 | | | 601 |
| Moisture regain, % | 4.2 | 4.0 | 3.7 | 3.6 | 3.5 | 2.9 | 2.5 | 1.9 | | |
| Hydrolytic Stability | | | | | | | | | | |
| Retained tenacity, gpd | 5.0 | 6.6 | 9.0 | 11.5 | 10.7 | 11.4 | 13.4 | | | 9.0 |
| Tenacity retention, % | 21.3 | 25.7 | 34.7 | 46.0 | 58.2 | 70.8 | 65.0 | | | 52.0 |
| | HEAT TREATED YARN | | | | | | | | | |
| Tenacity, gpd | 21.5 | 28.0 | 26.5 | 21.3 | | | | | 22.9 | 18.8 |
| Elongation, % | 2.5 | 3.3 | 2.8 | 2.2 | | | | | 3.0 | 2.5 |
| Modulus, gpd | 910 | 838 | 977 | 1037 | | | | | 870 | 849 |
| Hydrolytic Stability | | | | | | | | | | |
| Retained tenacity, gpd | 9.1 | 9.8 | 13.9 | 15.6 | | | | | 20.7 | 16.2 |
| Tenacity retention, % | 42.5 | 35.0 | 52.5 | 58.9 | | | | | 90.4 | 86.1 |

TABLE 2

| | Heat Treated 200-300 d/1-0.75 dpf Yarns | | | | | | | |
|---|---|---|---|---|---|---|---|---|
| Example | 2 | 11 | 12 | 13 | 14 | 15 | 16 | 17 |
| Polymer | PPD-T | | | | PPD-T/ClT | | | |
| Mole % ClT | 0 | 5 | 10 | 20 | 30 | 40 | 50 | 60 |
| Inh. vis. dl/g | 6.3 | 7.7 | 7.6 | 5.9 | 5.9 | 5.4 | 4.7 | 5.2 |
| | AS SPUN YARN | | | | | | | |
| Denier | | | | 231 | | 205 | 225 | |
| Dpf | | | | 0.87 | | 0.77 | 0.84 | |
| Tenacity, gpd | | | | 23.1 | | 20.6 | 20.4 | |
| Elongation, % | | | | 3.1 | | 2.8 | 2.4 | |
| Modulus, gpd | | | | 746 | | 791 | 714 | |
| Hydrolytic Stability | | | | | | | | |
| Retained tenacity, gpd | | | | 13.5 | | 13.7 | 15.3 | |
| Tenacity retention, % | | | | 58.4 | | 66.5 | 75.0 | |
| | HEAT TREATED YARN | | | | | | | |
| Tenacity, gpd | 24.5 | 28.6 | 26.7 | 22.0 | 21.3 | 20.3 | 18.6 | 21.1 |
| Elongation, % | 2.3 | 3.1 | 2.8 | 2.3 | 2.3 | 2.7 | 2.1 | 3.1 |
| Modulus, gpd | 1091 | 931 | 912 | 934 | 952 | 779 | 934 | 827 |

TABLE 2-continued

Heat Treated 200-300 d/1-0.75 dpf Yarns

| Example | 2 | 11 | 12 | 13 | 14 | 15 | 16 | 17 |
|---|---|---|---|---|---|---|---|---|
| Polymer | PPD-T | | | | PPD-T/ClT | | | |
| Mole % ClT | 0 | 5 | 10 | 20 | 30 | 40 | 50 | 60 |
| Inh. vis. dl/g | 6.3 | 7.7 | 7.6 | 5.9 | 5.9 | 5.4 | 4.7 | 5.2 |
| Hydrolytic Stability | | | | | | | | |
| Retained tenacity, gpd | 15.1 | 15.8 | 15.3 | 19.9 | 15.8 | 16.6 | 18.0 | 16.9 |
| Tenacity retention | 61.6 | 55.2 | 57.3 | 90.5 | 74.2 | 81.8 | 96.8 | 80.1 |

TABLE 3

Heat Treated PPD-T/ClT/DClT Yarns

| Example | 18 | 19 | 20 | 21 | 22 | 23 | 24 |
|---|---|---|---|---|---|---|---|
| Polymer | | | | PPD-T/ClT/DClT | | | |
| Mole % ClT/DClT | 16/4.5 | | | 8/3 | 0/5 | 0/10 | 0/18 |
| Inh. vis. dl/g | | | | | 6.2 | 5.6 | 4.8 |
| HEAT TREATED YARN | | | | | | | |
| Yarn denier | 187 | 398 | 385 | 193 | 418 | 410 | 514 |
| Average dpf | 0.7 | 1.5 | 1.5 | 0.7 | 1.5 | 1.5 | 1.9 |
| Tenacity, gpd | 20.4 | 19.0 | 24.3 | 20.6 | 23.8 | 23.0 | 22.3 |
| Elongation, % | 2.4 | 2.1 | 2.8 | 2.4 | 2.8 | 3.3 | 3.2 |
| Modulus, gpd | 875 | 915 | 863 | 1001 | 879 | 733 | 771 |
| Hydrolytic Stability | | | | | | | |
| Retained tenacity, gpd | 18.1 | 16.8 | 11.8 | 19.1 | 13.5 | 10.6 | 14.9 |
| % Tenacity retention | 88.7 | 88.4 | 48.6 | 92.7 | 56.7 | 46.1 | 66.8 |

TABLE 4

High Tension Dried Yarns

| Example | 25 | 26 | 27 | 28 | 29 | 30 | 31 | 32 |
|---|---|---|---|---|---|---|---|---|
| Polymer | PPD-T | | | | PPD-T/TCl | | | |
| Mole % ClT | | 0 | 10 | 20 | 40 | 50 | 60 | 70 |
| Inh. vis. dl/g | 6.3 | 6.3 | 7.6 | 5.9 | 5.9 | 4.7 | 5.2 | 3.9 |
| AS SPUN YARN | | | | | | | | |
| Yarn denier | 386 | 214 | 370 | 234 | 334 | 321 | 234 | 370 |
| Dpf | 1.45 | 0.80 | 1.4 | 0.88 | 1.25 | | | 1.39 |
| Tenacity, gpd | 24.5 | 23.3 | 26.5 | 23.4 | 23.0 | 20.6 | 19.5 | 19.8 |
| Elongation, % | 2.5 | 2.3 | 2.8 | 3.1 | 2.9 | 2.5 | 2.4 | 3.8 |
| Modulus, gpd | 989 | 1035 | 977 | 789 | 854 | 891 | 868 | 664 |
| Hydrolytic Stability | | | | | | | | |
| Retained tenacity, gpd | 10.5 | 11.6 | 13.1 | 16.0 | 16.0 | 18.1 | 16.6 | 17.0 |
| % Tenacity retention | 42.9 | 49.8 | 49.4 | 68.3 | 89.6 | 87.9 | 85.1 | 85.9 |

TABLE 5

Fibers of PPD-T/ClT vs. Blend of PPD-T and PPD-ClT

| | Example | | |
|---|---|---|---|
| | 33 | 34 | 1 |
| | Polymer | | |
| HEAT TREATED YARN | 80/20 PPD-T/ClT | 80/20 blend of PPD-T and PPD-ClT | Homo-polymer PPD-T |
| Denier | 63.8 | 61.6 | 403 |
| Tenacity, gpd | 24.5 | 24.2 | 21.5 |
| Elongation, % | 3.0 | 3.2 | 2.5 |
| Modulus, gpd | 847 | 719 | 910 |
| Hydrolytic Stability | | | |
| Retained tenacity, gpd | 14.2 | 13.7 | 9.1 |
| Tenacity retention, % | 58.0 | 56.6 | 42.5 |

I claim:

1. An aromatic polyamide yarn of an aromatic polyamide from (1) at least one aromatic diamine and (2) at least one aromatic diacid chloride wherein (2) comprises at least 10 mole percent chloroterephthaloyl chlorides;
the yarn exhibiting a tenacity of greater than 18 grams per denier and a hydrolytic stability of greater than 60%.

2. The yarn of claim 1 wherein (2) comprises at least 20 mole percent chloroterephthaloyl chlorides.

3. The yarn of claim 1 wherein the chloroterephthaloyl chlorides are more than 70 mole percent monochloroterephthaloyl chloride.

4. The yarn of claim 1 wherein the chloroterephthaloyl chlorides are more than 70 mole percent dichloroterephthaloyl chloride.

5. The yarn of claim 1 wherein the chloroterephthaloyl is present in a copolymer of diamine and a combination of terephthaloyl chloride and chloroterephthaloyl chloride.

6. An aromatic polyamide yarn of a blend of aromatic polyamide homopolymers from (1) an aromatic diamine and (2) an aromatic diacid chloride selected from the group consisting of terephthaloyl chloride and chloroterephthaloyl chlorides and wherein the chloroterephthaloyl is present in one homopolymer of the blend of homopolymers.

7. The yarn of claim 1 wherein the aromatic polyamide is copoly(p-phenylene terephthalamide/chloroterephthalamide).

8. The yarn of claim 1 wherein the aromatic polyamide is copoly(p-phenylene terephthalamide/dichloroterephthalamide).

9. The yarn of claim 1 wherein the aromatic polyamide is copoly(p-phenylene terephthalamide/chloroterephthalamide/dichloroterephthalamide).

10. The yarn of claim 1 wherein the aromatic polyamide is poly(p-phenylene terephthalamide) and poly(p-phenylene chloroterephthalamide).

11. The yarn of claim 1 wherein the tenacity is greater than 20 grams per denier and the hydrolytic stability is greater than 70%.

12. The yarn of claim 11 wherein at least 20 mole percent of the aromatic diacid chlorides are chloroterephthaloyl chlorides.

13. A copoly(p-phenylene terephthalamide/chloroterephthalamide) yarn of a copoly(p-phenylene terephthalamide/chloroterephthalamide) from (1) p-phenylene diamine and (2) at least one diacid chloride selected from terephthaloyl chloride and chloroterephthaloyl chloride wherein (2) comprises at least 10 mole percent of chloroterephthaloyl chlorides;

the hydrolytic stability and tenacity of the yarn being greater than the hydrolytic stability and the tenacity of a yarn of the same dimensions and made by the same processes, but using a homopolymer of poly(p-phenylene terephthalamide).

* * * * *